A. O. AUSTIN.
STRAIN INSULATOR.
APPLICATION FILED MAY 24, 1916.
1,284,974.
Patented Nov. 19, 1918.
4 SHEETS—SHEET 1.
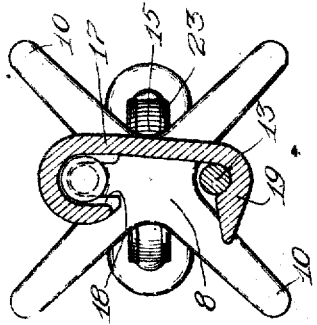
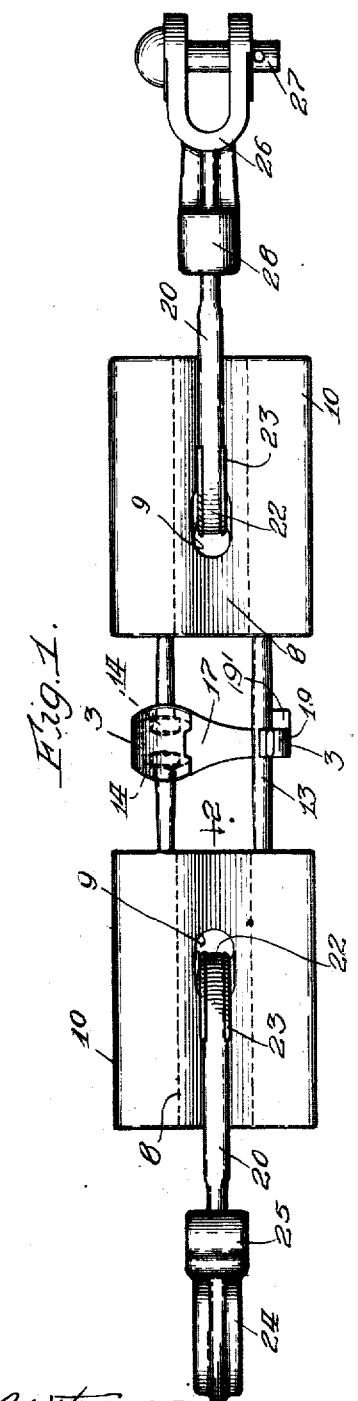
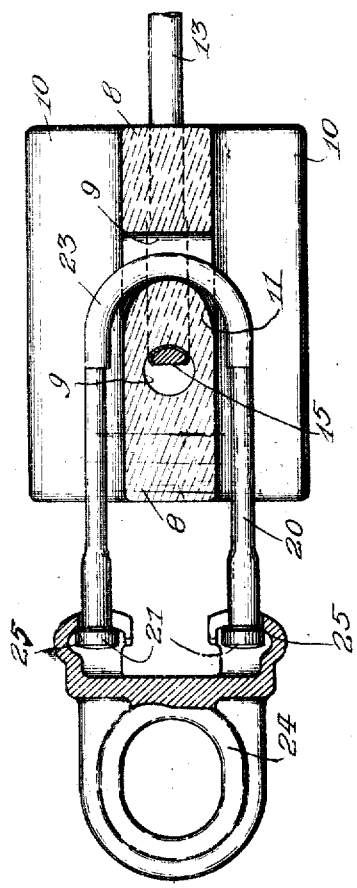
Inventor
Arthur O. Austin.
By Brown, Nissen & Sprinkle
Att'ys A. O. AUSTIN.
STRAIN INSULATOR.
APPLICATION FILED MAY 24, 1916.
1,284,974.
Patented Nov. 19, 1918.
4 SHEETS—SHEET 2.
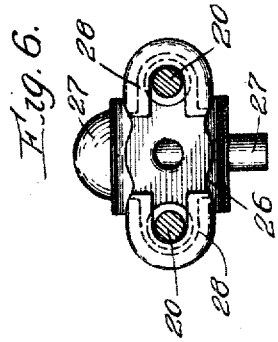
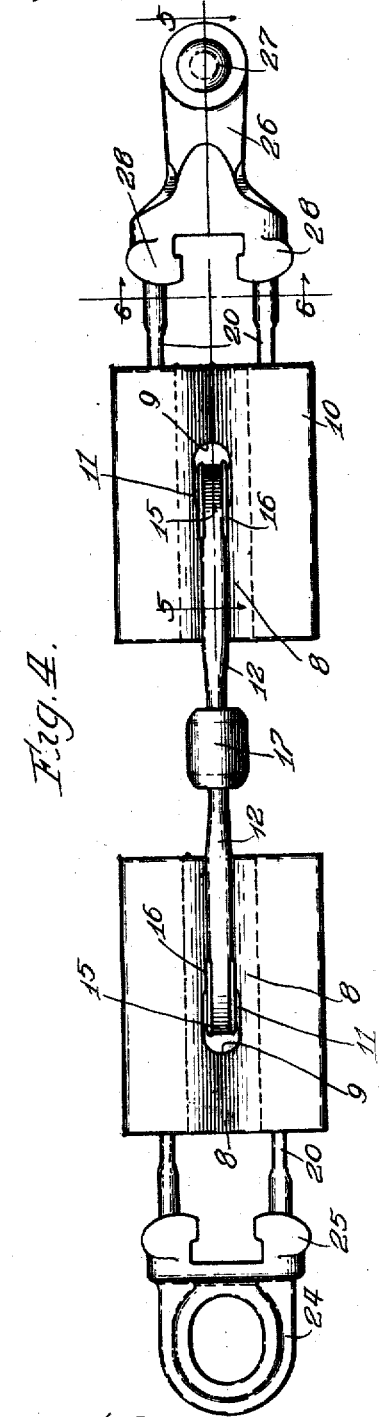
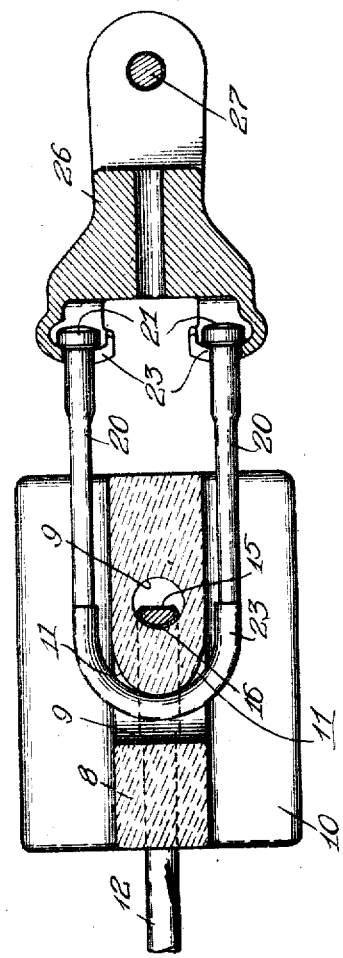
Inventor,
Arthur O Austin.
By Brown, Nissen & Sprinkle.
Attys.
Witness:
R. L. Farrington A. O. AUSTIN.
STRAIN INSULATOR.
APPLICATION FILED MAY 24, 1916.
1,284,974.
Patented Nov. 19, 1918.
4 SHEETS—SHEET 3.
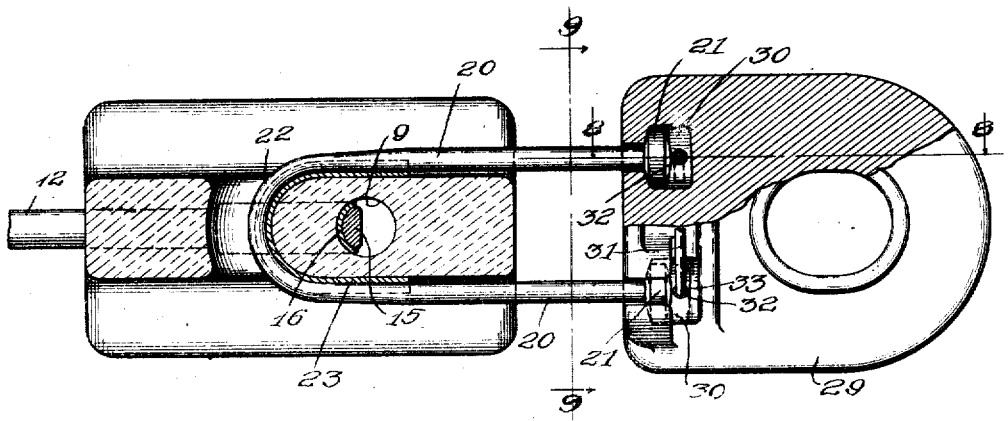
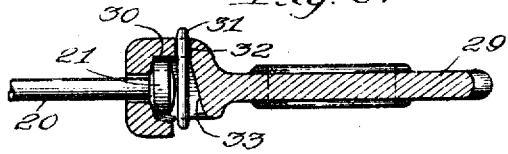
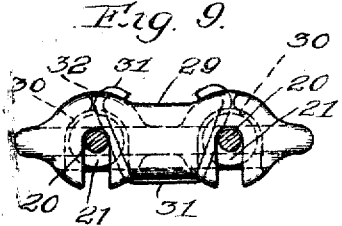
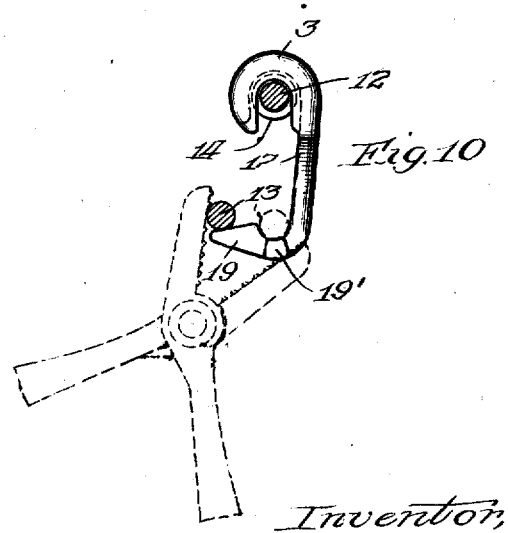
Witness:
R. L. Farrington
Inventor,
Arthur O. Austin.
By Brown, Nissen & Sprinkle
Attys

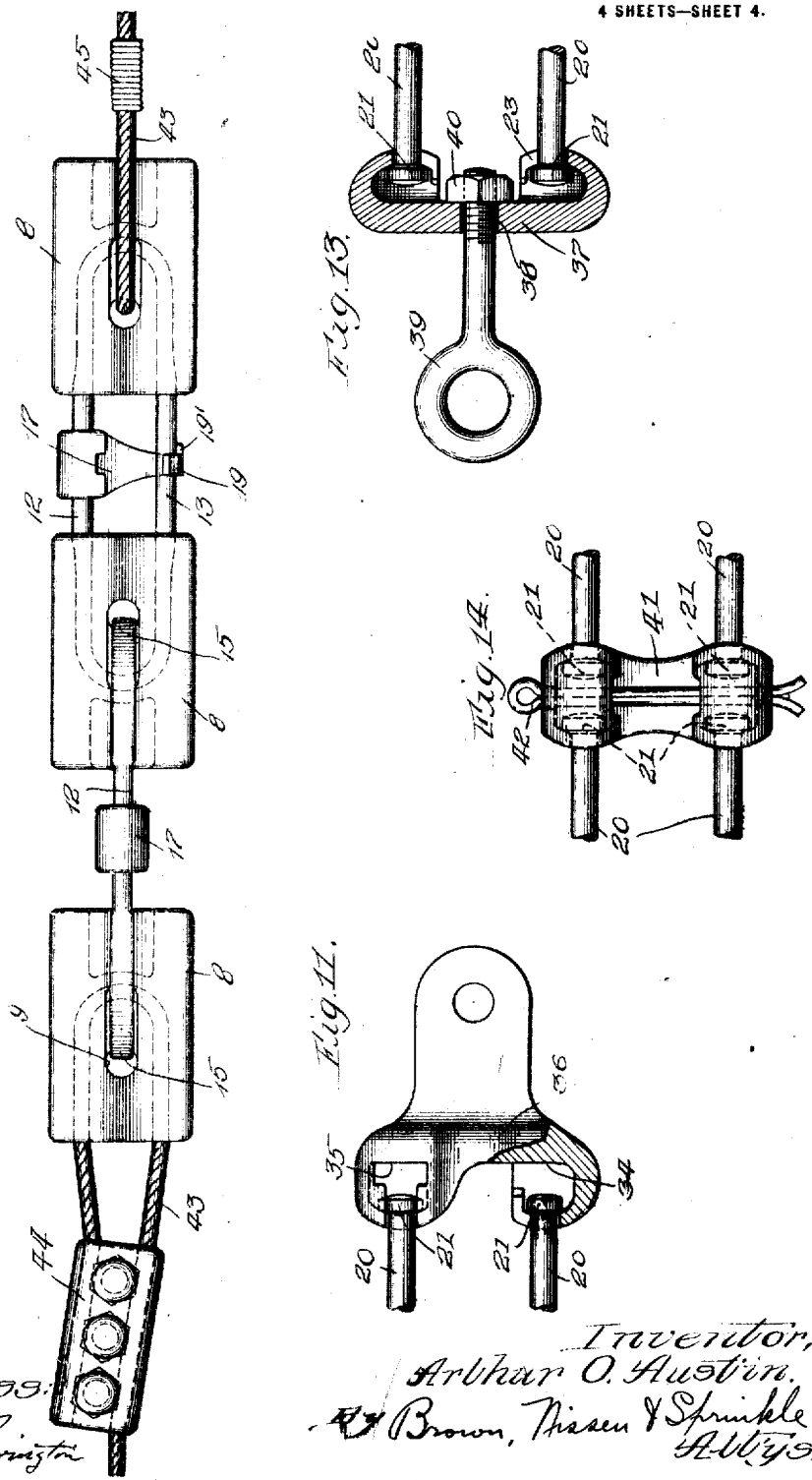

UNITED STATES PATENT OFFICE.

ARTHUR O. AUSTIN, OF BARBERTON, OHIO, ASSIGNOR TO THE OHIO BRASS COMPANY, OF MANSFIELD, OHIO, A CORPORATION OF NEW JERSEY.

STRAIN-INSULATOR.

1,284,974.  Specification of Letters Patent.  Patented Nov. 19, 1918.

Application filed May 24, 1916. Serial No. 99,522.

*To all whom it may concern:*

Be it known that I, ARTHUR O. AUSTIN, a citizen of the United States, residing at Barberton, in the county of Summit and State of Ohio, have invented certain new and useful Improvements in Strain-Insulators, of which the following is a specification.

This invention relates to insulators, and more particularly to the means for connecting insulating members together or to strain wires. The principal object of the invention is to provide a construction, combination and arrangement of parts by means of which insulating members can be quickly, easily and efficiently connected.

In the accompanying drawings—Figure 1 is a side elevation of a strain insulator constructed in accordance with the principle of this invention; Fig. 2 is a sectional view taken on line 2—2 of Fig. 1; Fig. 3 is a cross-sectional view taken on line 3—3 of Fig. 1; Fig. 4 is another view of the insulator shown in Fig. 1; Fig. 5 is a longitudinal section taken on line 5—5 of Fig. 4; Fig. 6 is a section taken on line 6—6 of Fig. 4; Fig. 7 is a view partly in section of an insulator unit and a side opening strap supporting member; Fig. 8 is a sectional view taken on the line 8—8 of Fig. 7; Fig. 9 is a view taken on the line 9—9 of Fig. 7; Fig. 10 is a perspective showing the means for fastening the latch; Fig. 11 is a view showing a holder with one side opening socket and one radially opening socket; Fig. 12 shows an insulator of three connected units and the end connections; Fig. 13 is a view partly in section showing one means for holding the headed extremities of the connecting links in position in their sockets; and Fig. 14 shows a double ended socket member with means for holding the headed extremities in place.

The present invention is designed and intended to provide a simple and efficient means for connecting a certain type of insulating units together and to strain wires or supports.

Among the advantages gained by this construction are—that the insulating units can be connected more closely together; a uniformly good connection can be made between each pair of units or between any end unit and the member to which it is attached; by making a uniformly good joint, the personal element in tightening or connecting the several parts, is entirely eliminated; the construction is therefore "fool proof" and of high mechanical strength, depending only upon the strength of the materials used.

This invention is particularly designed and intended for use in connection with insulators constructed with a plurality of radially extending ribs. In the drawings, an insulator of this type, having four ribs is shown, although it is obvious that the insulators may have more ribs, thus increasing the leakage surface, and depending upon the size of the insulating units. This type of insulator, having longitudinally extending ribs, may be formed by shooting or extruding the material from or through a die, thus making the insulators of uniform cross section and in long strips from which the units may be cut to the desired length.

In Fig. 1 of the drawings, two similar insulating members 8 of the type which is described, provided with apertures 9 at right angles to each other, are linked together and provided with end attaching means. As shown in elevation in Fig. 3, each insulating member is formed with longitudinally extending ribs 10 which separate the openings 9 at right angles to each other. These insulating members or units 8 are of the interlinking type in which the opening 9 having a link connected therethrough, is inside of another link extending from the other opening 9 and from the other end of the insulating member. The object of this construction is to prevent the actual separation of the inter-linked connecting member, even if the latter should be entirely broken, for it is obvious that if there are a plurality of insulating members in series, the breaking of one may not actually cause an electrical break-down, whereas, if the connecting parts were not interlinked, a mechanical break would also cause an electrical break-down. The edges 11 of the openings 9 are rounded away to form a better bearing surface for the connecting links.

In order to connect two insulating members 8, a link 12 is provided which has a central portion 13 substantially round in cross section, with headed extremities 14. Intermediate the center and each extremity, is a flattened or partially flattened portion 15 which is rounded on its inner face to substantially correspond with the curved surface 11. Secured to the flattened or rounded portion on the inside thereof, is a sheet or ribbon 16 of yielding material such as lead or the like, which acts as a cushion between the hard material of which the link is constructed and the brittle surface of the insulating member, and conforming to the surface of the insulating member, equalizes the pressure due to the strain placed upon the insulating parts. The bent portions of each link are preferably rounded on one side and flattened on the other, as clearly shown in the section views, Figs. 3, 5 and 7. These portions are formed so that they may be bent and inserted more readily through the openings 9 of the insulating members 8, and also to offer a greater contact surface for engagement with the insulating member than they would if the connecting link were round in cross section at these places.

The headed extremities 14 of each of the links 12, are held together by means of a connecting hook 17 formed with opposite sockets 18 for engaging each of the heads and with an extending latch 19 which may be pressed over the middle portion 13 of the connecting link 12 and held in engagement therewith. A projection 19' is commonly provided at one side of the latch 19 to provide means for engagement with a pair of pliers, as shown in Fig. 10, for engaging or disengaging the latch with the link 12.

Connected to and extending from the end of each insulating member 8, is a strap 20 substantially U-shaped, having headed extremities 21 and an intermediate flattened portion 22, the inside of which is covered with yielding material 23. In order to engage the headed extremities 21, an eye member 24 is provided with sockets 25 which open inwardly so that the headed extremities must be sprung into position where they will be held by the sockets, the straps being of resilient material, so that they will be held firmly in the sockets and must be sprung in order to disengage them.

Instead of the eye member 24, an end member 26 may be provided having a pivot pin 27 and engaging sockets 28 similar to the sockets 25 already described.

Instead of providing the connecting end members with sockets which open from the inside, an end member 29 may be formed with side opening sockets 30 in which the headed extremities of the straps 20 may be inserted without springing them, and the heads may then be held in place by means of a cotter pin or wire 31 inserted through openings 32. This construction is shown in section by Figs. 8 and 9 and in Fig. 8 it will be seen that the rear portion 33 of the socket is inclined outwardly therefrom, so that the end member 29 must be inclined or tipped at an angle in applying it to the headed member. With this construction, it is apparent also that since it is not necessary to spring the extremities of the strap 20 in order to engage and disengage them, the parallel sides of the member 20 may lie against or substantially against the section of the insulator as shown more clearly in Fig. 7. In the construction as shown in Figs. 2 and 5, it is usually necessary to allow a little space between the insulating member and the sides of the strap member, so that the extremities can be sprung.

Another way of making the sockets, is to place them on opposite sides of the socket member to which they are connected. Or one socket may be a radial internally opening socket, as indicated by the reference numeral 34 in Fig. 11, while the other socket 35 is a side opening socket, so that the end member 36 may be rotated into engagement with the headed extremities. These methods are best where the connecting straps are heavy and cannot be sprung into radial slots.

Another means for locking the headed extremities in their sockets is shown in Fig. 13, in which an end member 37 is provided with a perforation 38 through which the headed end of an eye bolt 39 extends. A nut 40 is threaded on the end of the eye bolt after the headed extremities 21 are in their sockets 23 and they cannot be disengaged until the nut 40 is removed.

If desired, a double ended socket member 41 may be substituted for the connector 17 which would do away with the connecting latch 19. With this construction, a cotter 42 would be inserted through the sides of the member holding the headed extremities in position. The objection to this construction is that it is not as rigid as the connecting link 12 and does not hold the insulating members in proper position.

It is understood, of course, that instead of connecting a complete insulator, consisting of a plurality of members linked together by means of the socketed end connectors, the end insulating members may be connected to wire cables 43, as shown in Fig. 12. These cables may be attached in any suitable manner, as, for, example, by the nut clamping member 44 shown at one end or by simply making a wrapped joint 45, as shown at the other end. In such a construction, it is necessary only to disengage one of the connecting members 17 and to unfasten the link 12 in order to disengage the insulating members. Of course in practice, the number and size of insulators between two terminals, as the cables 43, depends upon the applied voltage.

I claim:

1. In a strain insulator, a pair of perforated insulating members, and a connector therefor comprising a metal link having bent portions inserted through the perforations, and ends adjacent each other, and a fastening device engaging both ends with an extending portion for engaging another portion of the link to hold the device in place.

2. In a strain insulator, a pair of perforated insulating members, a metal strap connecting the members with adjacent headed extremities, and a socketed member to engage the headed extremities with an extending portion to engage another portion of the strap for holding the socketed member in position.

3. In a strain insulator, a pair of insulating members with perforations curved longitudinally thereof; a connecting strap of uniform body throughout but having bendable flattened portions inserted through the perforation and forming greater bearing surface on the members, and with adjacent headed extremities; and a socketed connecting member engaging said headed extremities with an extending portion to yieldingly engage another portion of the strap for holding the member in place.

4. In a strain insulator, the combination with a pair of insulating members; of a metal connecting link therefor, the ends of which are bent and inserted one through each of the members with the extremities of the link intermediate the members; and a connecting device for joining the extremities of said link having a projecting portion to engage the other part of the link between the insulating members.

5. In a strain insulator, the combination with a pair of perforated insulating members; of a metal connecting link therefor formed with a bend intermediate the center and each of the ends for engaging one of the members, the extremities of the link being disposed adjacent each other and intermediate the members; and a fastening means to engage the extremities with a latch to be sprung over the other portion of the link between the said members.

6. In a strain insulator, the combination with a pair of perforated insulating members and connecting link therefor comprising a metal strap formed with headed ends and a bend between the center and each end adapted to be inserted through the perforation of one of the members, the headed extremities being disposed intermediate the members and adjacent each other; a connector member having pockets to engage both of the headed extremities; and a latch extending therefrom adapted to be sprung over the center of the link between the two insulating members.

7. In a strain insulator, an insulating member having a transverse perforation rounded at one side to form a semi-circular bearing surface, and a connecting strap of substantially uniform body throughout flattened to enable it to be bent through said perforation and rounded in conformity to said semi-circular bearing surface so that the maximum bearing surface is presented.

8. In a strain insulator, the combination with a perforated insulating member having rounded portions at the ends of the perforations; of a metal connecting strap therefor parts of which are circular in cross-section but having a substantially flat portion bent in a semi-circle adapted to be inserted through the perforation of the member partially conforming to the curvature of the perforation and the rounded edges thereof affording greater bearing surface; and a soft metal coating for only the flat portion of the strap which is in engagement with the member when a strain is placed on the insulator.

9. In a strain insulator, the combination with a perforated insulating member; of a connecting strap therefor formed of metal with headed extremities, having rigid portions circular in cross-section and with a substantially flat bearing portion adapted to be bent and inserted through the perforation of the insulator, thereby affording more bearing surface than the circular section; a yielding metal secured to the flat portion of the strap and abutting the insulator for equalizing the pressure of the strap against the insulator; and means for connecting the headed ends of the strap.

10. In a strain insulator, the combination with a pair of insulating members each formed with spaced openings at right angles to each other; a metal connecting link comprising a strap adapted to be inserted through the perforations of the members with the extremities disposed between them; a socketed device for connecting the ends of the strap with an extending spring tongue engaging the strap intermediate the members; a terminal connection for each of the insulating members comprising a metal strap inserted through the other perforation of the insulating member and interlinked with the connecting link; and a terminal member for detachably engaging the extremities of the metal terminal strap.

11. In a strain insulator, the combination with a pair of insulating members each formed with spaced perforations at right angles to each other; a connector therefor with headed extremities bent adjacent the ends and each end inserted through one of the perforations of an insulating member with the headed extremities disposed adjacent each other between them; a connecting member having pockets for detachably engaging the headed extremities; a latch adapted to be sprung over the opposite portion of the link between the members; and a strain terminal connection for each insulating member.

12. In a strain insulator, the combination with a pair of insulating members, and a connecting link therefor comprising a metal strap formed with headed ends and a bend between the center thereof and each end adapting the length to be inserted through the perforations of the said members, the headed extremities being disposed intermediate the members and adjacent each other; a connector member having sockets to engage both of the headed extremities; a latch extending from the member adapted to be sprung over the end center of the length between the two insulating members, and a lateral projection from the latch for moving it into and out of engagement with the center of the link.

13. In a strain insulator, a pair of insulating members, and a metal connecting member therefor having ends bent adjacent each other to form a loop, and a device which connects the ends and has an extending portion which is sprung over an intermediate portion of the member to hold it yieldingly in place.

In testimony whereof I have signed my name to this specification, in the presence of two subscribing witnesses, on this 18th day of May, A. D. 1916.

ARTHUR O. AUSTIN.

Witnesses:
 A. H. KIRKLAND,
 BESS MORTON.